(12) United States Patent
Strong et al.

(10) Patent No.: US 7,500,550 B2
(45) Date of Patent: Mar. 10, 2009

(54) CONVEYING CONFORMABLE PRODUCTS

(75) Inventors: John R. Strong, Kirkland, WA (US); Lennart Olsson, Nyhamnsläge (SE)

(73) Assignee: John Bean Technologies Corporation, Chicago, IL (US)

(*) Notice: Subject to any disclaimer, the term of this patent is extended or adjusted under 35 U.S.C. 154(b) by 423 days.

(21) Appl. No.: 11/321,756

(22) Filed: Dec. 28, 2005

(65) Prior Publication Data

US 2006/0163032 A1  Jul. 27, 2006

Related U.S. Application Data

(60) Provisional application No. 60/640,282, filed on Dec. 30, 2004.

(51) Int. Cl.
  *B65G 1/00* (2006.01)
  *B65G 37/00* (2006.01)
(52) U.S. Cl. ............... 198/347.1; 198/792; 198/334; 198/419.2; 198/459.8
(58) Field of Classification Search ............. 198/347.1, 198/577, 792, 460.2, 783, 460.1, 347.2, 594, 198/334, 461.1, 812, 343.1, 459.8, 833, 419.2, 198/462.1, 462.3, 850
See application file for complete search history.

(56) References Cited

U.S. PATENT DOCUMENTS

| | | | |
|---|---|---|---|
| 3,403,772 A * | 10/1968 | Vadas ...................... 198/419.2 |
| 3,467,239 A | 9/1969 | Roinestad | |
| 3,944,044 A * | 3/1976 | Hamy ........................ 198/334 |
| 4,962,844 A | 10/1990 | Francioni | |
| 5,501,319 A * | 3/1996 | Larson et al. ................ 198/778 |
| 5,505,293 A * | 4/1996 | Ochs et al. ............. 198/810.04 |
| 6,193,054 B1 * | 2/2001 | Henson et al. .............. 198/783 |
| 6,237,750 B1 * | 5/2001 | Damkjaer et al. ........... 198/778 |
| 6,766,898 B2 * | 7/2004 | Lessard et al. .............. 198/792 |
| 2003/0047425 A1 * | 3/2003 | Lessard et al. .............. 198/812 |
| 2004/0112713 A1 * | 6/2004 | Haan et al. ................ 198/419.2 |

FOREIGN PATENT DOCUMENTS

| EP | 0 813 814 A3 | 12/1997 |
|---|---|---|
| GB | 2 052 420 A | 1/1981 |
| GB | 2 111 010 A | 6/1983 |
| WO | 97/38929 A1 | 10/1997 |
| WO | WO 99/37564 A1 | 7/1999 |

* cited by examiner

*Primary Examiner*—Gene Crawford
*Assistant Examiner*—William R Harp
(74) *Attorney, Agent, or Firm*—Christensen O'Connor Johnson Kindness PLLC

(57) ABSTRACT

A buffer conveyor (12) for conveying conformable work products (66) includes a collapsible conveyor belt (13) having an infeed section (14), a collapsible intermediate section (16) and an outfeed section (18). The infeed section (14) may be driven at a non-continuous speed, and the outfeed section may also be driven at a uniform, or non-continuous, speed, but the average speed of both the infeed and outfeed sections is the same. The intermediate section of the conveyor is driven at a non-uniform speed that is slower than, but proportional to, the speed of the infeed section.

20 Claims, 5 Drawing Sheets

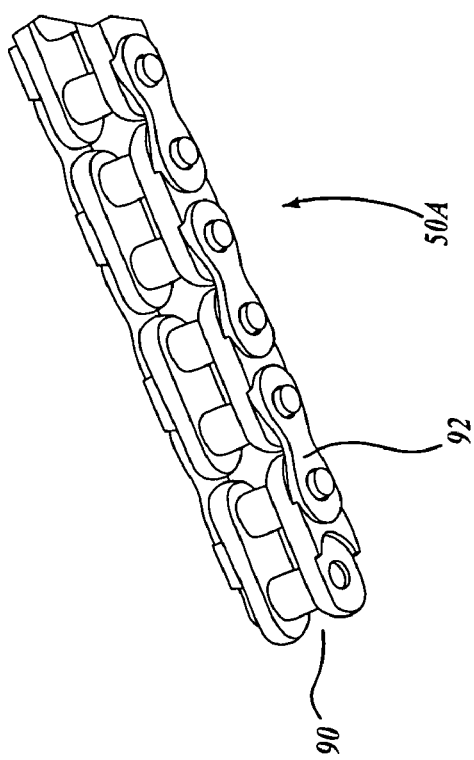
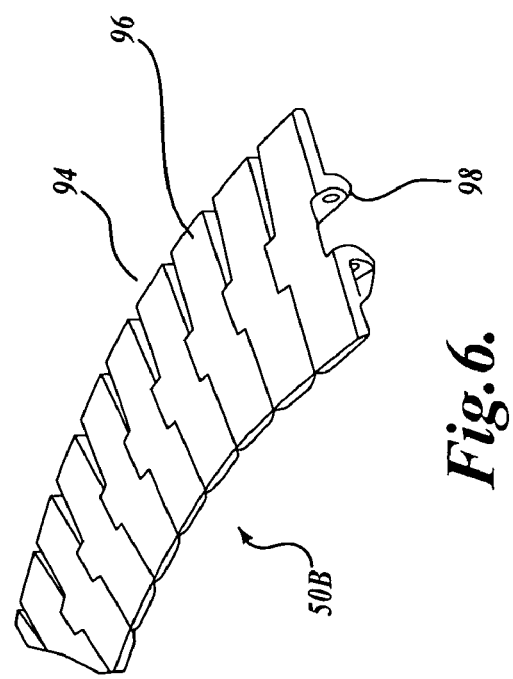
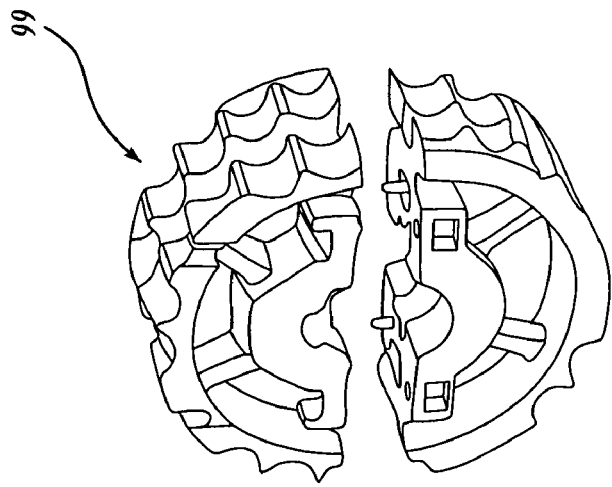

CONVEYING CONFORMABLE PRODUCTS

CROSS-REFERENCE TO RELATED APPLICATION

This application is based on and claims the benefit of U.S. Provisional Application No. 60/640,282, filed Dec. 30, 2004.

TECHNICAL FIELD

The present invention relates to processing work products, and more specifically to conveying work products for processing.

BACKGROUND

Referring to FIG. 1, work products 100, including food products, are cut or otherwise portioned into smaller portions by processors in accordance with customer needs. Also, excess fat, bone, and other foreign or undesired materials are routinely trimmed from food products. It is usually highly desirable to portion and/or trim the work products into uniform shapes, thicknesses, and/or sizes, for example, for steaks to be served at restaurants or chicken fillets used in frozen dinners or in chicken burgers. Much of the portioning/trimming of work products, in particular food products, is now carried out with the use of high-speed portioning systems. These systems, for example, system 101 schematically shown in FIG. 1, use various scanning techniques to ascertain the size and shape of the food product as it is being advanced on a moving conveyor 102. This information is analyzed with the aid of a computer 104 to determine how to most efficiently portion the food product into optimum sizes, weights, or other criteria being used. For example, a customer may desire chicken breast portions in a certain shape or two different weight sizes, but with no fat or with a limited amount of acceptable fat. The chicken breast is scanned as it moves on a conveyor belt 106 and a determination is made through the use of a computer as to how best to portion the chicken breast to the shape and weights desired by the customer, so as to portion the chicken breast most effectively. Work products are also scanned for sorting the work products, to verify that the work product is being processed properly to track production volume, and to control upstream and downstream equipment.

Portioning and/or trimming of the work product can be carried out by various cutting devices such as cutters 108 and slicers 110. Once the portioning/trimming has occurred, the resulting portions are off-loaded from the cutting conveyor and placed on a take-away conveyor for further processing or, perhaps, to be placed in a storage bin.

Portioning systems of the foregoing type are known in the art. As typical, the portioning system includes a conveyor that carries work products past a stationary scanning station 112 associated with the conveyor, whereat the work products are scanned to ascertain selected physical parameters, for example, their size, shape, and thickness, and then determine their weight, typically by utilizing an assumed density for the work products. In addition, it is possible to locate discontinuities (including voids), foreign material, and undesirable material in the work product, for example, bones or fat in a meat portion. Also, as noted above, scanning can determine if the work product is being processed properly, track production levels or volume, control production equipment, and assist in sorting the work products.

The scanning can be carried out utilizing a variety of techniques, including a video camera to view a work product illuminated by one or more light sources. Light from the light source is extended across the moving conveyor belt to define a sharp shadow or light stripe line, with the area forwardly of the transverse beam being dark. When no work product is being carried by the infeed conveyor, the shadow line/light stripe forms a straight line across the conveyor belt. However, when a work product passes across the shadow line/light stripe, the upper, irregular surface of the work product produces an irregular shadow line/light stripe as viewed by a video camera directed downwardly on the work product and the shadow line/light stripe. The video camera detects the displacement of the shadow line/light stripe from the position it would occupy if no work product were present on the conveyor belt. This displacement represents the thickness of the work product along the shadow line/light stripe. The length of the work product is determined by the distance of belt travel that shadow lines/light stripes are created by the work product. In this regard, an encoder is integrated into the infeed conveyor, with the encoder generating pulses at fixed distance intervals corresponding to the forward movement of the conveyor.

In lieu of a video camera, the scanning station may instead utilize an x-ray apparatus for determining the physical characteristics of the work product, including its shape, mass and weight. X-rays may be passed through the object in the direction of an x-ray detector. Such x-rays are attenuated by the work product in proportion to the mass thereof. The x-ray detector is capable of measuring the intensity of the x-rays received thereby after passing through the work product. This information is utilized to determine the overall shape and size of the work product, as well as the mass thereof. An example of such an x-ray scanning device is disclosed by U.S. Pat. No. 5,585,603, incorporated by reference herein.

The data and information measured/gathered by the scanning devices is transmitted to computer 104, preferably on board the portioning apparatus, which records the location of the work product on the conveyors as well as the shape, size, and other parameters of the work product. With this information, the computer can determine how to optimally cut or portion the work product at the portioning station, whether processes need to be changed or adjusted, if production levels or volumes are acceptable, and if upstream or downstream equipment needs to be adjusted.

Automatic portioning systems are expensive, as is the labor to continuously load and unload them. One of the keys to economical production using automatic portioning is to keep the conveyor belt full of properly spaced work product. Any gaps in loading the conveyor belt entering the portioner are wasted production potential, and cost as much as if work product were being processed. Small gaps in the continuous arrival of product to the automatic portioning apparatus can occur for various reasons, including: problems in upstream processes; material handling delays such as putting the next tote of work product into place; the inattention of loading employees; poor quality product that employees need to reject; and automatic sorting equipment upstream that sorts into multiple streams according to a randomly varying work product attribute.

While buffering functions are common in processing lines handling rigid products such as beverage containers, or continuous products such as liquids, they are unknown to the present inventors in processing of wet, conformable, naturally random work products such as boneless chicken breasts or fish fillets, except as large bins of work product that are subsequently loaded again onto a conveyor belt. An additional requirement for a buffer in front of an automatic portioning apparatus is that the work product maintains its orientation on the conveyor belt such that it is not flipped, rotated or folded as might occur when using a storage bin as a buffer. This is important for minimizing loading labor leading into the automatic portioning apparatus.

SUMMARY OF THE INVENTION

This summary is provided to introduce a selection of concepts in a simplified form that are further described below in the detailed description. This summary is not intended to identify key features of the claimed subject matter, nor is it intended to be used as an aid in determining the scope of the claimed subject matter.

A system for processing conformable work products, for example, food products, includes processing equipment to perform one or more processing operations on the work products. The system also includes a buffer conveyor to receive the work products at a non-uniform frequency and present the work products to the processing equipment at a uniform frequency. The buffer conveyor includes a collapsible conveyor belt that is driven by an infeed drive system at a variable speed related, for example, to a rate that work products are available for loading onto the conveyor belt or the rate that work products are actually loaded onto the conveyor belt. The buffer conveyor also includes an outfeed drive system for driving the collapsible conveyor belt at a substantially uniform speed to present work products for the processing equipment at a uniform frequency. The buffer conveyor further includes an intermediate drive system for supporting the collapsible conveyor belt intermediate the infeed drive system and the outfeed drive system, and driving the intermediate portion of the conveyor belt at a speed proportional to, but slower than, the speed of the infeed drive system.

The infeed drive system of the buffer conveyor powers the conveyor belt by frictional engagement therewith. The intermediate drive system of the buffer conveyor also drives the conveyor belt by frictional engagement therewith.

The buffer conveyor utilizes a belt take-up system to take up slack in the conveyor belt when the infeed drive system operates at a speed slower than the speed of the outfeed drive system, and gives up slack in the conveyor belt when the infeed drive system operates at a speed faster than the speed of the outfeed drive system.

The buffer conveyor is also capable of an operational mode wherein the infeed drive system drives the infeed section of the conveyor belt at a substantially constant speed, and the outfeed drive system drives the outfeed section of the conveyor belt at a non-constant speed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is an isometric view of a fragmentary portion of a drive chain;

FIG. 6 is a fragmentary isometric view of another drive chain; and

FIG. 7 is an exploded isometric view of a sprocket engageable with the drive chain of FIG. 6.

DETAILED DESCRIPTION

Figure 2:
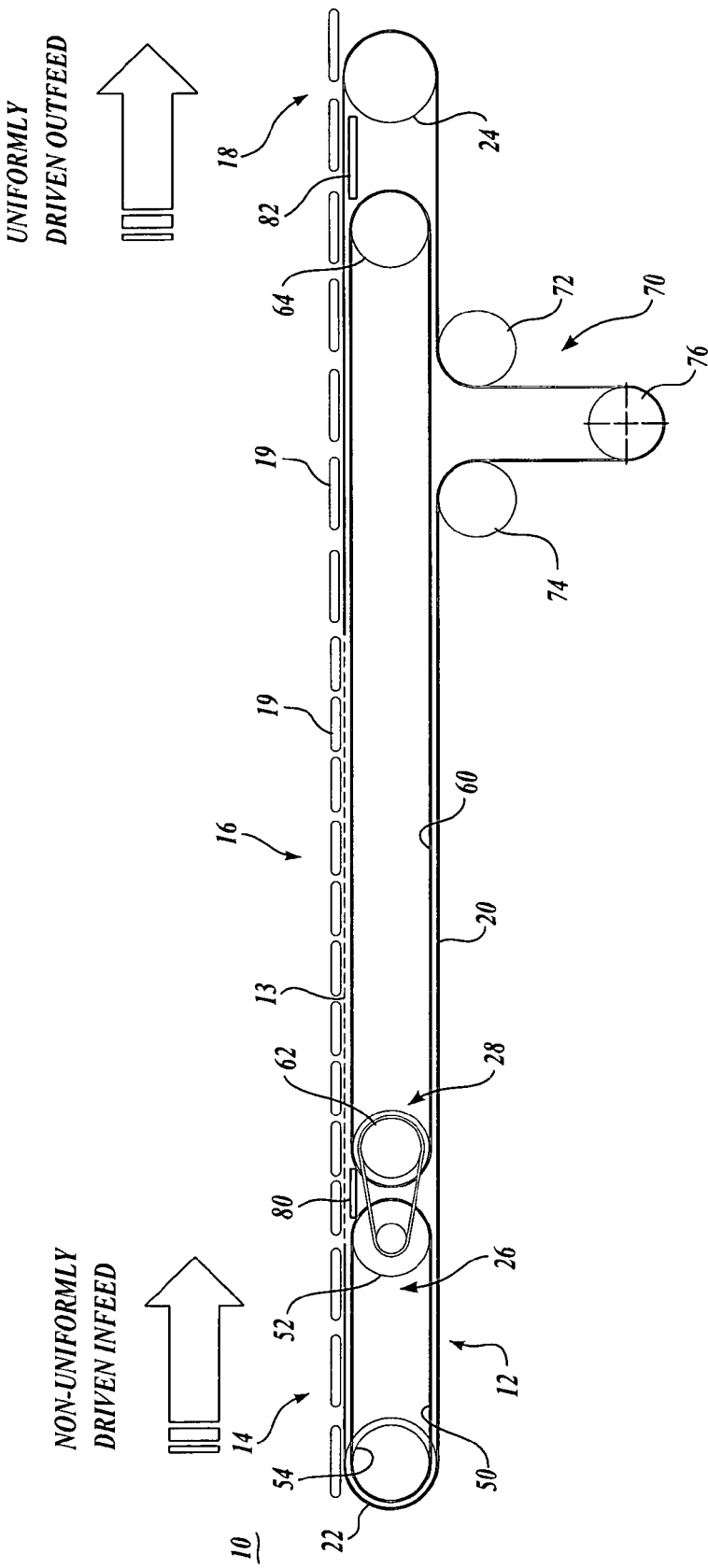
FIG. 2 is a schematic side elevational view of a buffer conveyor embodiment.
Figure 3:
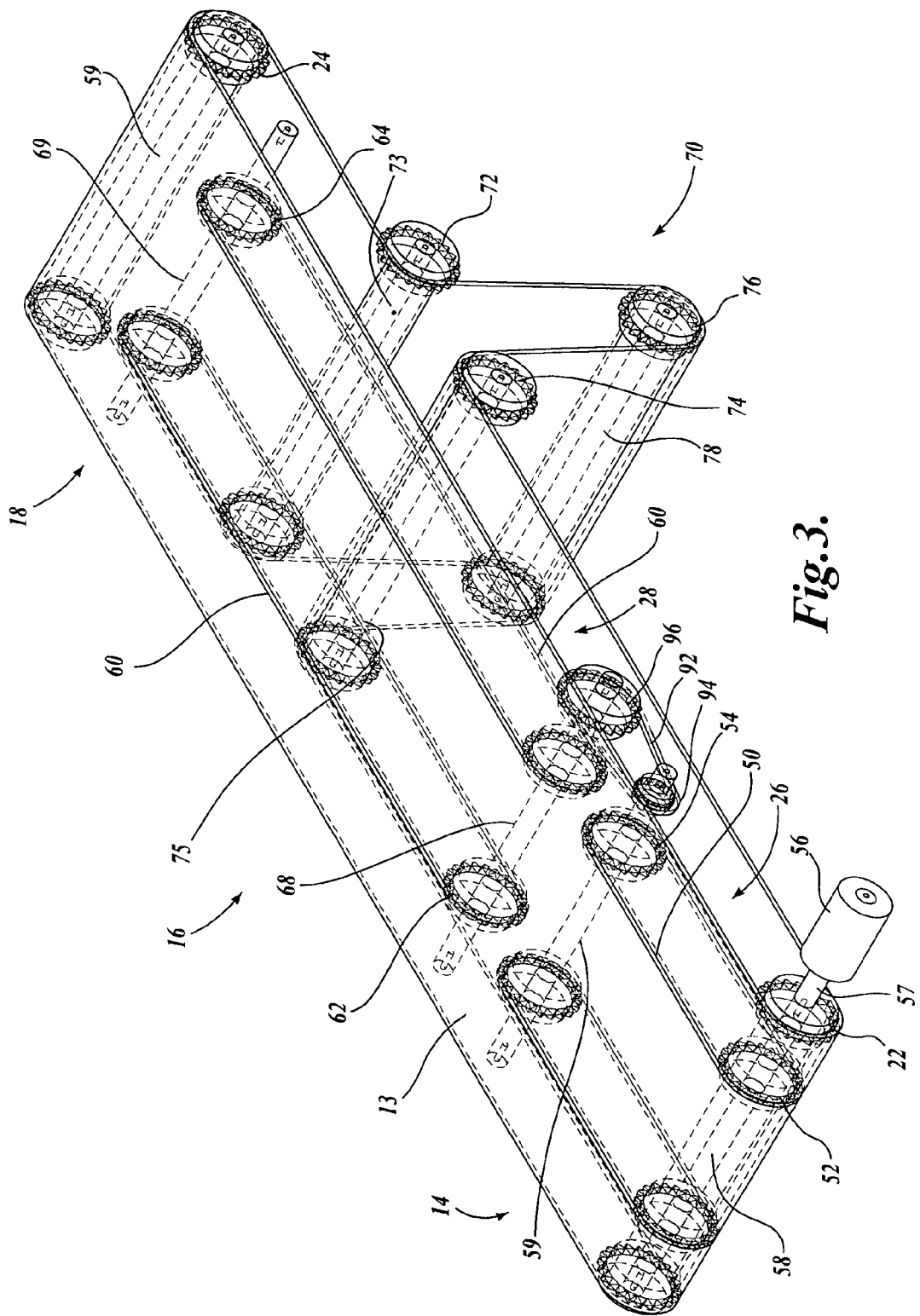
FIG. 3 is an isometric view of the buffer conveyor of FIG. 1.

An in-line buffer conveyor system 10 is illustrated in FIGS. 2 and 3 as including an endless, collapsible conveyor 12 composed of an infeed section 14, followed by a collapsible intermediate section 16, followed by an outfeed section 18. The conveyor 12 includes an endless belt 13 for supporting work products 19 thereon having a return run 20 extending from the outfeed section 18 to the infeed section 14. At the infeed end, belt 13 wraps around infeed roller set 22, while at the outfeed end, the belt 13 wraps around an outfeed roller set 24. The infeed rollers 22 are part of an infeed drive system 26 that drives and supports the infeed section 14 of the belt 13. The intermediate portion of the belt 13 is supported and driven by an intermediate drive system 28.

Figure 4:
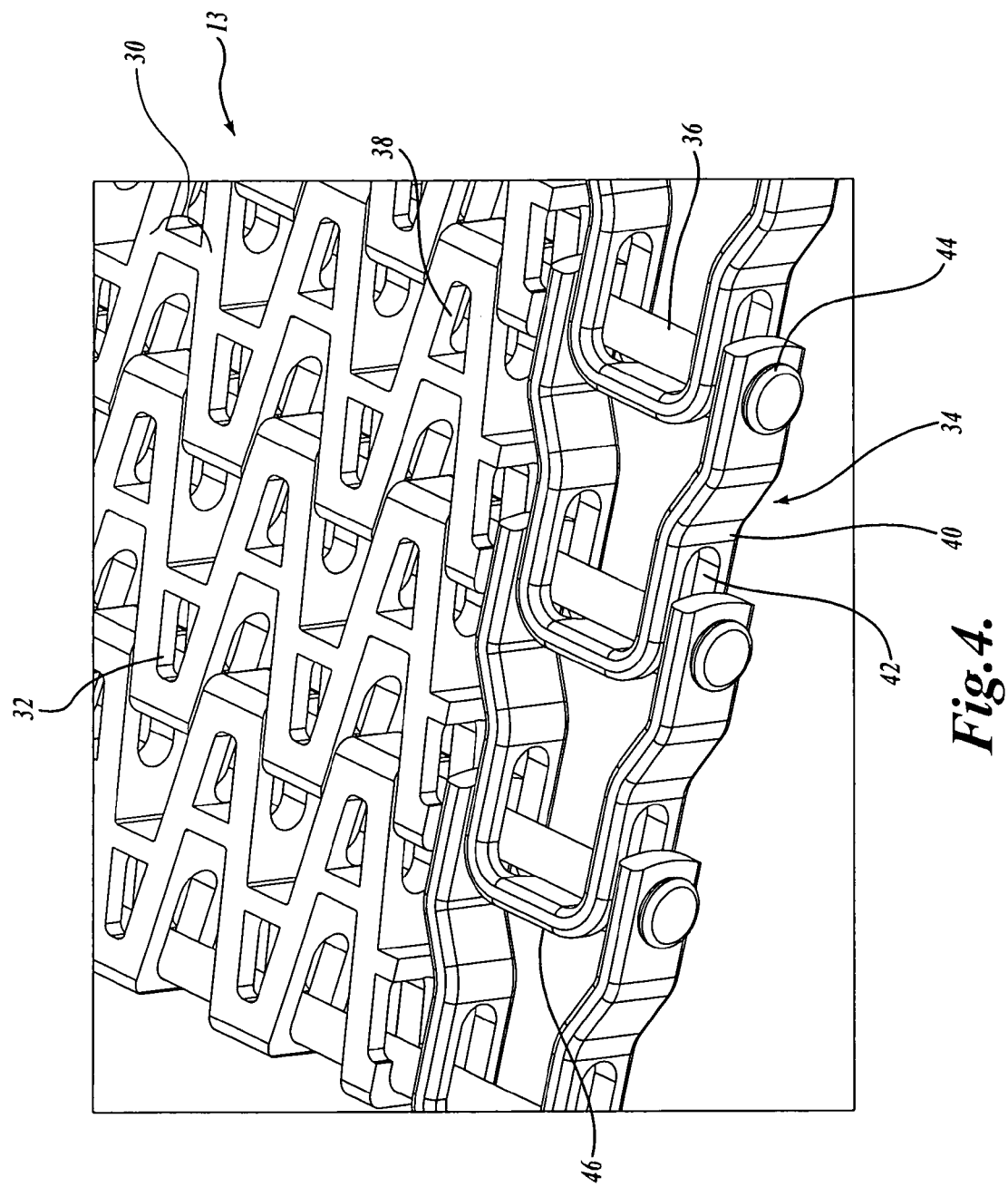
FIG. 4 is a fragmentary view of a conveyor belt.

In defining the foregoing components of the present invention in more detail, as shown in FIG. 4, the conveyor belt 13 defines a conveying surface 30 formed from a plurality of transverse pickets 32 that are pivotably joined to one another and to drive chains 34 extending along the sides of the belt 13 by a plurality of transverse connecting rods 36. The connecting rods extend through elongate slots 38 formed in the pickets, thereby to join adjacent pickets one to another, as well as to join the pickets to the drive chains 34.

The pickets are formed in a continuous V or wave shape extending across the conveyor belt 13, and adjacent rows of pickets are offset relative to each other to nest together. The drive chains 34 are composed of sequentially disposed, generally U-shaped links 40 having slots 42 formed along the sides thereof adjacent the closed ends 46 of the links to receive connecting rods 36. Through-holes are formed in the opposite free ends 44 of the links to receive the connecting rods 36. As shown in FIG. 3, the links 40 are nested, one to the other, so that the open, free ends 44 of the links span or extend outwardly of the narrower closed end 46 of an adjacent link.

The conveyor belt 13 is trained around infeed and outfeed roller sets 22 and 24 that may include teeth, not shown, that engage drive chains 34 in a standard manner. As will be appreciated, constructing links 40 with slots 42 and pickets 32 with slots 38 enable the conveyor belt 13 to collapse or, in other words, enable the pickets and links to become more tightly nested relative to each other, thereby shortening the length of the conveyor belt, as desired, for example, in the intermediate section 16.

Although one construction of a collapsible conveyor belt 13 has been described, it is to be understood that the conveyor belt may be of other constructions without departing from the scope or spirit of the present application. Collapsible conveyor belts that might be utilized in the present invention are articles of commerce, available from numerous sources.

The conveyor infeed section 14 is supported and frictionally drawn forwardly by infeed drive section 26, consisting of infeed drive system in the form of chains 50 trained about drive rollers 52 and driven rollers 54. As shown on FIG. 3, the drive rollers 52 and infeed rollers 22 are joined together and supported by axle 58 so that they are all driven in union by drive shaft 57, which is powered by a motor 56.

The drive chains 50 underlie and frictionally drive the conveyor belt 13 with the belt in expanded condition. The drive chains 50 can be of various configurations and constitute an article of commerce. As shown in FIG. 5, the infeed drive chains 50 can be of the roller chain design 50A consisting of individual links 90 interconnected by side plates 92. The links 90 can be composed of a plastic or similar material, while the side plates 92 can be composed of stainless steel or another metallic material to provide reinforcement for the chains 50. The chains 50 can engage with sprocket teeth or similar teeth formed about the periphery of drive rollers 52 and driven rollers 54.

As shown in FIGS. 6 and 7, the infeed drive chains can be of a "table-top" type designated as 50b. The chains 50b are composed of individual links 94 having a flat upper surface 96 and interconnected link elements 98 disposed beneath the top surfaces 96. The link elements 98 allow the individual links 94 to pivot in a manner of a standard chain to engage and ride around rollers, such as roller 99 shown in FIG. 7. The link elements 98 also allow the links 94 to pivot somewhat laterally, as shown in FIG. 6, although such lateral pivoting is not necessarily required in the present situation.

The infeed drive system 26 may drive the belt infeed section 14 at an intermittent and/or variable speed rate depending on the availability of work product to be loaded onto the conveyor infeed section 14. If at any given time work product is not available, then the infeed section may actually be stopped. Also, the infeed conveyor section 14 may be operated rather quickly or at a fast rate to accommodate the loading of significant numbers of work product. Thus, the speed of operation of the conveyor infeed section 14 will depend on availability of work product and how quickly such work product is being loaded onto the infeed section. However, as described below, the average speed of the infeed section 14 is the same as the average speed of the outfeed section 18.

The length of the infeed section 14 may vary depending on various factors, such as the overall length of the belt 13, the average speed of the belt infeed section, the size of the work product being carried by the belt, or other factors. As one non-limiting example for processing food products, such as poultry breasts, the conveyor infeed section may be from about 12 to 24 inches long.

As shown in FIGS. 2 and 3, the intermediate section 16 of the belt 13 is supported and driven by intermediate drive system 28, which consists of endless support/drive chains 60 comprising a support system trained around proximal rollers 62 adjacent the conveyor infeed section 14 and distal rollers 64 adjacent the outfeed rollers 24. The proximal rollers 62 are carried and interconnected by an axle 68 and the distal rollers 64 are carried and interconnected by an axle 69. The proximal rollers 62 of the intermediate drive system 28 are interconnected to axle 59 of the infeed drive system by a chain 92 trained around a drive sprocket or roller 94 mounted on axle 59 and a larger sprocket or roller 96 mounted on axle 68 comprising the drive system for the endless support/drive chains. As such, the speed at which drive chains 60 are driven is a function of the speed of the drive chains 50, which speed is related to the relative diameters of sprockets 94 and 96.

The intermediate drive chains 60 may be the same or similar in construction to infeed drive chains 50, discussed above. The intermediate drive chains 60 are in frictional engagement with an intermediate section of the belt 13 to support such intermediate section and drive such intermediate section downstream of the infeed section 14. As noted above, the speed that the intermediate drive chains 60 drive the conveyor intermediate section 16 is a function of the speed of the infeed section 14, but at a speed that is slower than the speed of the infeed section 14. As a consequence, the portion of conveyor belt 13 extending along the intermediate conveyor section 16 is in collapsed condition, wherein the pickets 32 are in closer relative position to each other, as are the belt links 40. As a result, the work products 19 being carried by the conveyor intermediate section 16 are positioned closer together than at the conveyor infeed section 14. Also as will be appreciated, the relative portion or length of the conveyor belt 13 that is actually collapsed, and the extent to which the conveyor belt is collapsed, depends on how far ahead or behind the conveyor outfeed section 18 is relative to the conveyor infeed section 16 at any point in time. However, as noted above, on average, the infeed rollers 22 and outfeed rollers 24 are driven at the same speed.

As shown in FIG. 2, as the belt 13 approaches the outfeed section 18, the outfeed rollers 24 pull the collapsed belt into a non-collapsed condition, thus sliding the belt along and over the intermediate support chains 60. By the time the belt 13 reaches outfeed rollers 24, the belt is in fully extended position so that the relative spacing between the work product exiting the conveyor 12 is the same as the relative spacing of the work product entering the conveyor 12 at the conveyor infeed section 14.

As can be appreciated, belt 13 is "pushed" into a collapsed position because it is carried from the infeed rollers 22/infeed drive system 26 to a collapsing point between the infeed drive chains 50 and the intermediate drive chains 60 at the higher speed of the infeed drive system. Thus, the belt 13 collapses at the transition from the faster moving infeed drive chains 50 to the slower moving intermediate drive chains 60.

The belt 13 may be supported by underlying support members or rails 80 and 82, that support the belt 13 whenever the belt is not supported by the infeed drive chains 50 or the intermediate drive chains 60. Thus, such support rails 80 are positioned in the gap between the infeed drive chains and the intermediate drive chains. Support members or rails 82 may also be positioned between the intermediate driven rollers 64 and the outfeed rollers 24. The support rails 80 and 82 may be composed of a tough, wear-resistant polymer material or other suitable material.

As described above, a varying length of the conveyor belt 13 will be in collapsed position at any one time. To accommodate this situation, a take-up system 70 is provided to either take up the slack in the conveyor return run 20 or give up the slack in the conveyor return run. The take-up system 70 may be of standard construction, consisting of idler roller sets 72 and 74 mounted on and carried by axles 73 and 75. Also, a take-up roller set 76, mounted on axle 78, is positioned between the roller sets 72 and 74. The take-up roller 76 may be loaded or biased by conventional arrangements in the direction away from the idler roller sets 72 and 74, thereby to maintain a desired tension level or load level in the return run 20 of the belt 13.

When the conveyor system 12 is in use, a nominal section of the belts 13 constituting the conveyor intermediate section 16 is in collapsed position. The belt is trained about infeed rollers 22 and outfeed rollers 24, as well as driven by infeed drive system 26 and intermediate drive system 28. It will be appreciated that if the infeed rollers 22 were relied upon to drive belt 13, such rollers 22 would tend to cause the belt to bunch up, probably causing the belt chain to skip teeth of the rollers 22.

Work product 19 is loaded on the conveyor at infeed section 14 at a rate which may not be uniform. As a consequence, the infeed section 14 will typically operate at a noncontinuous speed reflective of the rate that work product 19 is actually loaded onto the infeed section. The loaded work product 19 is advanced along the conveyor infeed section 14 toward the conveyor intermediate section 16. The conveyor intermediate section 16 operates at a speed that is related to, but slower than the speed of the conveyor infeed section 16. As a consequence, when the conveyor belt 13 reaches the conveyor intermediate section 16, the belt collapses and the work product 19 on the conveyor belt is thereby shifted closer together.

The work product 19, if a conformable product such as raw meat or poultry, may actually compress or bunch when the belt 13 collapses. As the belt 13 approaches the outfeed section 18, the faster operating outfeed roller 24 pulls on the collapsed belt and draws the collapsed belt into a non-collapsed, fully extended position, causing the belt to actually slide over the intermediate support chains 60. By the time the work product 19 reaches the distal end of the conveyor outfeed section 18, the belt 13 is in fully expanded condition and the work product 19 regains or returns to the nominal spacing relative to each other which originally existed at the conveyor infeed section 14. In this manner, it is possible to provide work products 19 at the conveyor outfeed section 18 at a constant rate even though the work products are loaded onto the conveyor 12 at the infeed section 14 at a non-constant rate.

Conveyor system 10 includes a control system consisting of one or more scanning devices, electric eyes, etc., for monitoring the condition of the take-up system 70. The condition or position of the take-up system is a direct reflection or measurement of the buffer capacity available for the conveyor system 10.

As will be appreciated, if the average speeds of the belt infeed and outfeed sections do not match, eventually there will be no further belt take-up available, or the take-up system will be in "maximum condition" and there will be no compressed belt in the conveyor intermediate section 16. The monitoring system provides a feedback to the product loading process to indicate if the buffer is fully utilized so that the take-up system is in minimal position, such that the loading process needs to slow down or stop for a time. If the loading process does not slow down or stop, it will eventually be necessary to stop the infeed section for a time and manually redistribute or relocate the collection or pile of work product 19 that develops.

On the other hand, if the feedback to the loading process indicates that the buffer system 70 is in condition so that the belt take-up is nearly full, the loading process needs to speed up for a time. If there is no such feedback or if such feedback does not result in a change in loading, then the feedback system needs to signal the infeed and intermediate drive systems 26 and 28 to operate more quickly to avoid the belt 13 being empty at the outfeed section 18.

As a practical matter, the components of conveyor system 10 cannot be accelerated, decelerated, or stopped instantaneously in response to the absence or presence of work product at the infeed section 14. When the conveyor 12 is being operated at high speed with closely spaced work product 19, the control system operates to accelerate or decelerate the conveyor infeed section 14 and/or conveyor intermediate section 16 at controlled rates. For example, if work product is suddenly absent, the control system will decelerate the infeed section 14 at a controlled rate and then perhaps reverse the infeed section a short distance to be ready for the arrival of new work products. When additional work products arrive, the control system is capable of accelerating the infeed section 14 at a controlled rate. In this regard, the control system may include a computer and/or programmable logic controllers.

The conveyor 12 may be operated in substantially reverse condition whereby the work product 19 is loaded onto the infeed section 14 at a relatively constant rate; however, the work product is discharged from the conveyor 13 at a non-uniform rate. In this mode of operation of the conveyor 12, as well as in the other modes described herein, the average speed of the infeed roller 22 and outfeed roller 24 is the same, though the relative rate at any point in time may differ substantially.

In a further operational mode, both the conveyor infeed section 14 and the conveyor outfeed section 18 may operate at non-uniform or at non-continuous speeds or at rates to accommodate various conditions, such as the availability of work product at the conveyor infeed section and the demand or need for the work product from the conveyor outfeed section 18. In this mode, as in the prior two modes, the length of the conveyor belt 13 that is collapsed will vary depending on how far ahead or behind the outfeed section 18 is relative to the infeed section 14. Also in this mode, the average speed of the outfeed rollers 24 will match the average speed of the infeed rollers 22.

Although the present subject matter has been described in language specific to structural features and methological acts, it is to be understood that the subject matter defined in the appended claims is not necessarily limited to the specific features or acts described above. Rather, the specific features and acts described above are disclosed as example forms of implementing the claims. In this regard, the conveyor 12 may be constructed differently than described above including the construction of the belt 13 as well as the manner in which the belt 13 is driven and supported.

A possible alternative construction of a buffer conveyor system for conformable products consists of 3 or 4 independent conveyors (not shown), stacked vertically above and below each other. A loading conveyor (not shown), with a robotically controlled outfeed end, loads work products onto one of the stacked conveyors. The stacked conveyor that is receiving work product only moves when work product is arriving. When that conveyor is full (the work product has moved down the entire length of it), the loading conveyor moves to another of the stacked conveyors for loading. Meanwhile, one of the stacked conveyors that has already been loaded is unloaded by transferring the work product onto an unloading conveyor or chute (not shown) that moves and aligns to the correct stacked conveyor. The stacked conveyor that is in the process of being unloaded moves at a constant speed representing the average work product flow. When the last work product transfers off of this stacked conveyor, the unloading conveyor or chute moves to another stacked conveyor that is full of work product. It is necessary to time the moves of the loading and unloading conveyors to prevent work product from being caught in the wrong place during the moves.

It is also possible to provide a similar system using horizontal arrangements of conveyors (not shown) rather than vertical stacked arrangements.

Although the conveyor 12 is illustrated as driven by a motor 56 coupled to axle 58 by drive shaft 57, the conveyor may be instead driven at other locations. In this regard, as described above, the infeed rollers 22, drive rollers 52, driven rollers 54, proximal rollers 62, distal rollers 64, and outfeed rollers 24 are all drivingly interconnected to each other by axle 58, drive belts 50 and 60, interconnecting belt 92, as well as by the conveyor belt 13 itself.

Figure 1:
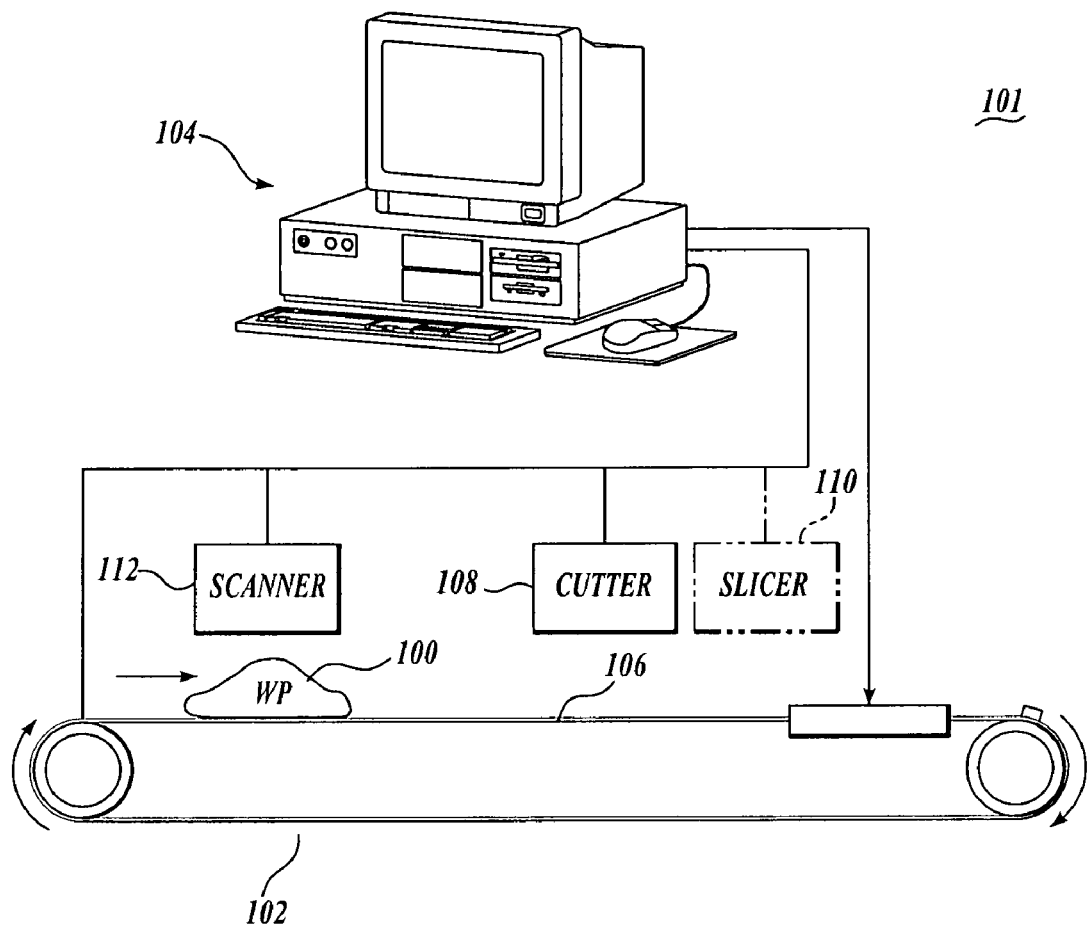
FIG. 1 is a schematic view of a portioning system.

As another possibility, the conveyor infeed section 14 and conveyor intermediate section 16 may be separately or independently driven. For example, the conveyor infeed section 14 may be driven as described above, via motor 56 and drive shaft 57. A similar motor and drive shaft may be coupled to axle 68 of rollers 62 or axle 69 of rollers 64. The relative speeds of drive chains 50 and 60 can be controlled electrically or electronically. In this regard, the collapse ratio of belt 13 may be changed, as desired, whereas the collapse ratio of the belt, as shown in FIGS. 1 and 2, is dictated by the relative diameters of rollers 94 and 96, as described above.

Conveyor 12 has been described as a buffer conveyor. It is to be understood that conveyor 12 can function as a loading conveyor from which work product is transferred to a processing conveyor for processing using a system, for example, similar to system 101 shown in FIG. 1. Also, conveyor 12 can itself be part of a processing system, wherein scanners, cutters, slicers, and other processing equipment are integrated with the operation of the conveyor by a computer-aided control system.

Different embodiments of the drive chains 50 and 60 have been described above. In one embodiment the drive chains may be in the form of roller chains. In another embodiment, the drive chains are described as being of a "table top" type. Moreover, the drive chains 50 and 60 can be replaced with other types of drive systems, including V belts, timing belts, or other types of belt drives, chain drives, cable drives, or other types of drive systems. The important feature is that the particular drive system supports the conveyor belt 13 and drives the conveyor belt at the required speed.

The embodiments of the invention in which an exclusive property or privilege is claimed are defined as follows:

1. A system for processing conformable work products, comprising:
   (a) a processing apparatus to perform one or more processing operations on conformable work products;
   (b) a buffer conveyor for receiving work products at a non-uniform frequency and presenting work products for the processing apparatus at a uniform frequency, said buffer conveyor comprising:
      (i) a collapsible conveyor belt;
      (ii) an infeed drive system driving the collapsible conveyor belt at a variable speed related to a rate selected from a group consisting of the rate that work products are available for loading onto the conveyor belt and the rate that work products are loaded onto the conveyor belt; and
      (iii) an outfeed drive system driving the collapsible conveyor belt at a substantially uniform speed to present work products for the processing apparatus at a uniform frequency; and
   (c) an intermediate drive system for supporting the collapsible conveyor belt intermediate the infeed drive system and the outfeed drive system, said intermediate drive system structurally independent of the collapsible conveyor belt to drive the collapsible intermediate portion of the conveyor belt in proportion to and at a speed slower than the speed of the infeed drive system.

2. The system according to claim 1, wherein the outfeed drive system applies a tension load on the collapsible belt to draw the belt out of collapse condition and into an extended condition.

3. The system according to claim 1, wherein the intermediate drive system comprises a support system to support and drive the collapsed intermediate section of the conveyor belt, and a support system drive for driving the support system.

4. The system according to claim 3, further comprising support rails positioned beneath the conveyor belt to support at least the portion of the conveyor belt not supported by the infeed drive system, the outfeed drive system or the intermediate drive system.

5. The system according to claim 1, further comprising a belt take-up system to take up slack in the conveyor belt when the belt infeed drive system operates at a speed slower than the speed of the outfeed drive system and to give up slack in the conveyor belt when the infeed drive system operates at a speed faster than the speed of the outfeed drive system.

6. The system according to claim 1, wherein the infeed system drives the conveyor belt with conveyor belt in expanded condition.

7. A buffer conveyor system for conveying work products, comprising:
   (a) a collapsible conveyor belt having an infeed section, a collapsible intermediate section, and an outfeed section opposite the infeed section;
   (b) an infeed drive system drivingly engaged with the infeed section of the conveyor belt;
   (c) an outfeed drive system drivingly engaged with the outfeed section of the conveyor belt, the infeed drive system and outfeed drive system traveling at the same average speed; and
   (d) an intermediate drive system structurally independent of the collapsible conveyor belt to drive the collapsed intermediate section of the conveyor belt at a speed slower than the average speed of the input drive system.

8. The buffer conveyor according to claim 7, wherein the infeed drive system drives the infeed section of the conveyor belt at a variable speed related to the rate of loading of work products onto the infeed section of the conveyor belt.

9. The buffer conveyor according to claim 8, wherein the outfeed drive system drives the outfeed section of the conveyor belt at a speed ranging from a substantially constant speed to a variable speed.

10. The buffer conveyor according to claim 7, wherein the outfeed drive system drives the outfeed section of a conveyor belt at a non-continuous speed.

11. The buffer conveyor according to claim 7, wherein the infeed drive system drives the infeed section of the conveyor belt at a substantially constant speed and the outfeed drive system driving the outfeed section of the conveyor belt at a non-constant speed.

12. The buffer conveyor according to claim 7, wherein the intermediate drive system comprising:
   a support system drivingly engaging the collapsible intermediate section of the conveyor belt; and
   a support drive system to drive the support system at a speed less than the speed of the infeed drive system.

13. The buffer conveyor according to claim 12, further comprising support runners extending beneath the conveyor belt between the infeed drive system and the support system.

14. The buffer conveyor according to claim 13, further comprising support runners extending beneath the conveyor belt between the support system and the outfeed drive system.

15. A buffer conveyor according to claim 7, wherein:
   the conveyor belt further comprising a return run between the outfeed drive system and the infeed drive system; and
   a belt take-up system to maintain a desired tension level or tension range in the return run of the conveyor belt.

16. The buffer conveyor according to claim 15, further comprising a control system for monitoring the condition of the belt take-up system and adjusting the operation of the infeed drive system depending on the monitored condition of the belt take-up system.

17. A method for providing work products available at a non-uniform rate to a destination at a uniform rate using a conveyor having an infeed section, an intermediate section, and an outfeed section, the method comprising:
   (a) loading work products onto the conveyor infeed section at a variable rate;
   (b) transporting the work product on the conveyor downstream from the infeed section along the intermediate section by utilizing an intermediate drive system that is structurally independent of the conveyor and cooperating with the intermediate section of the conveyor to move the intermediate section at a speed related to, but slower than, the average speed of the conveyor infeed section, whereby the work products capable of becoming disposed closer together than at the conveyor infeed section; and (c) driving the conveyor outfeed section at a substantial uniform speed that is faster than the speed of the conveyor intermediate section, the average speed of the conveyor infeed section corresponding to the average speed of the conveyor outfeed section.

18. The method of claim 17, further comprising maintaining the angular orientation of the work product on the conveyor during the travel of the work product from the conveyor infeed section to the conveyor outfeed section.

19. The method of claim 17, further comprising:
(a) monitoring the condition of the conveyor related to the number of work products being conveyed and the relative spacing between the work products; and
(b) altering the speed of the conveyor infeed section based on the monitored condition of the conveyor.

20. A method for delivering conformable food products on a singular conveyor having a receiving location, a transport section, and a discharge location, the food products carried by the single conveyor to a processing location at a uniform rate when the food product is available at a non-uniform rate, comprising:

(a) receiving the food product at a non-uniform rate at the receiving location of the singular conveyor;
(b) using an intermediate drive system that is structurally independent of the singular conveyor and cooperating with the transport section of the conveyor to move the food product on the transport section of the conveyor from the receiving location toward the processing location at a non-uniform transport speed that is slower than the average rate that the food product is received at the receiving location to alter the speed of the transport section of the conveyor; and
(c) as the food product approaches the processing location, increasing the speed that the food product is moved to a speed that is faster than the transport speed by increasing the speed of the conveyor at the discharge location, such faster speed of the conveyor delivering the food product at the processing location at a rate matching the average receiving rate of the food product at the receiving location.

* * * * *